(12) United States Patent
Huebner et al.

(10) Patent No.: US 10,538,072 B2
(45) Date of Patent: Jan. 21, 2020

(54) DEVICES AND METHODS FOR DISPENSING ADHESIVE ELEMENTS

(71) Applicant: Gulfstream Aerospace Corporation, Savannah, GA (US)

(72) Inventors: Phillip Huebner, Savannah, GA (US); Robert Mollen, Savannah, GA (US); Charles Gosz, Savannah, GA (US); Paul Meier, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 93 days.

(21) Appl. No.: 15/949,538

(22) Filed: Apr. 10, 2018

(65) Prior Publication Data

US 2019/0308404 A1 Oct. 10, 2019

(51) Int. Cl.
*B32B 38/10* (2006.01)
*B32B 7/06* (2019.01)
*B32B 7/14* (2006.01)

(52) U.S. Cl.
CPC .............. *B32B 38/10* (2013.01); *B32B 7/06* (2013.01); *B32B 7/14* (2013.01)

(58) Field of Classification Search
USPC ........ 156/247, 249, 289, 391, 538, 540, 541
See application file for complete search history.

(56) References Cited

U.S. PATENT DOCUMENTS

| | | | | |
|---|---|---|---|---|
| 4,601,771 A * | 7/1986 | Wesley | ...................... | B65C 3/12 156/215 |
| 5,348,488 A * | 9/1994 | Green | ................. | H01R 12/7005 439/140 |
| 5,376,217 A * | 12/1994 | Janssen, Jr. | ......... | B32B 38/1833 156/361 |
| 5,512,125 A * | 4/1996 | Momot | ................. | B65C 9/1865 156/272.4 |
| 5,799,982 A * | 9/1998 | McClure | ................ | G11B 23/40 283/72 |
| 6,227,273 B1 * | 5/2001 | McClure | ................ | G11B 23/40 156/249 |
| 6,651,719 B2 * | 11/2003 | McClure | ................ | G11B 23/40 156/249 |
| 7,172,676 B2 * | 2/2007 | DeMeter | ................ | B23Q 3/084 156/275.7 |

(Continued)

FOREIGN PATENT DOCUMENTS

EP     2660063 A1    11/2013
JP     2015113382 A   6/2015

*Primary Examiner* — Sing P Chan (74) *Attorney, Agent, or Firm* — LKGlobal | Lorenz & Kopf, LLP (57) ABSTRACT

A device, a system and a method for dispensing adhesive elements are provided. The device comprising a first holder, a second holder, and an alignment element. The first holder is configured to rotatably hold a film having adhesive elements and a protective layer attached on adhesive areas of the adhesive elements. The second holder is configured to receive the protective layer as the protective layer is peeled off the adhesive areas of the adhesive elements while the adhesive elements are moved towards an alignment element. The alignment element is arranged in a direction of movement of the adhesive elements and configured to receive and align the adhesive elements at a predetermined position on the alignment element.

20 Claims, 5 Drawing Sheets

(56) References Cited

U.S. PATENT DOCUMENTS

| | | | |
|---|---|---|---|
| 8,231,024 B2* | 7/2012 | Sanfilippo | B65B 1/02 220/6 |
| 8,597,785 B2* | 12/2013 | Komiyatani | C09D 133/06 428/355 EP |
| 8,602,244 B2* | 12/2013 | Sanfilippo | B65B 1/02 220/6 |
| 8,944,131 B1 | 2/2015 | Williams | |
| 9,162,786 B2* | 10/2015 | Sanfilippo | B65B 1/02 |
| 9,850,018 B2* | 12/2017 | McNestry | B65C 9/1865 |
| 10,023,337 B2* | 7/2018 | Sanfilippo | B65B 1/02 |
| 10,065,760 B2* | 9/2018 | McNestry | B65C 9/1865 |
| 10,232,969 B2* | 3/2019 | Sanfilippo | B65B 1/02 |
| 2002/0023713 A1* | 2/2002 | McClure | G11B 23/40 156/249 |
| 2004/0026023 A1* | 2/2004 | DeMeter | B23Q 3/084 156/247 |
| 2004/0206458 A1* | 10/2004 | Hayasaka | B65C 9/1803 156/391 |
| 2008/0011416 A1* | 1/2008 | DeMeter | B23Q 3/084 156/273.3 |
| 2009/0120828 A1* | 5/2009 | Sanfilippo | B65B 1/02 206/508 |
| 2010/0024954 A1* | 2/2010 | Ito | B32B 38/185 156/64 |
| 2010/0203307 A1* | 8/2010 | Komiyatani | C09J 7/10 428/220 |
| 2012/0211389 A9* | 8/2012 | Sanfilippo | B65B 1/02 206/508 |
| 2012/0312868 A1* | 12/2012 | Sanfilippo | B65B 1/02 229/221 |
| 2014/0083897 A1* | 3/2014 | Sanfilippo | B65B 1/02 206/503 |
| 2014/0109522 A1* | 4/2014 | Sanfilippo | B65B 1/02 53/456 |
| 2014/0196406 A1* | 7/2014 | Sanfilippo | B65B 1/02 53/412 |
| 2015/0274347 A1* | 10/2015 | McNestry | B65C 9/1865 156/361 |
| 2015/0291302 A1* | 10/2015 | McNestry | B65C 9/1865 156/64 |
| 2019/0039771 A1* | 2/2019 | McNestry | B65C 9/1865 |
| 2019/0210752 A1* | 7/2019 | Sanfilippo | B31B 50/26 |

* cited by examiner

DEVICES AND METHODS FOR DISPENSING ADHESIVE ELEMENTS

TECHNICAL FIELD

Embodiments of the present invention generally relate to devices, and more particularly to systems and methods for dispensing adhesive elements.

BACKGROUND OF THE INVENTION

Adhesive elements are used for a wide range of applications, such as to join a coupling element with a piece of furniture.

Since adhesive elements are provided in films and are protected by a protective layer, the protective layer has to be peeled off an adhesive element before the adhesive element may be joined with a coupling element. Traditionally, the protective layer is peeled off manually by a user. Afterwards, the adhesive element is aligned and coupled with the coupling element. In an industrial company, manual coupling of adhesive elements and coupling elements is performed hundreds of times by workers every day. Both, the peeling off and the coupling is time consuming and may lead to finger fatigue and eye strain.

It is desirable to provide for automatic dispensing of adhesive elements. It is further desirable to provide for precise alignment of adhesive elements with a corresponding coupling element.

SUMMARY

The disclosed embodiments relate to a device for dispensing adhesive elements. In a first non-limiting embodiment, the device includes, but is not limited to, a first holder, a second holder, and an alignment element. The first holder is configured to rotatably hold a film having adhesive elements and a protective layer attached on adhesive areas of the adhesive elements. The second holder is configured to receive the protective layer as the protective layer is peeled off the adhesive areas of the adhesive elements while the adhesive elements are moved towards an alignment element. The alignment element is arranged in a direction of movement of the adhesive elements and configured to receive and align the adhesive elements at a predetermined position on the alignment element.

According to another non-limiting embodiment, a system for dispensing adhesive elements is provided. The system includes, but is not limited to, a first holder, a second holder, an alignment element and a storage unit. The first holder is configured to rotatably hold a film having adhesive elements and a protective layer attached on adhesive areas of the adhesive elements. The second holder is configured to receive the protective layer as the protective layer is peeled off the adhesive areas of the adhesive elements while the adhesive elements are moved towards an alignment element. The alignment element is arranged in a direction of movement of the adhesive elements and configured to receive and align the adhesive elements at a predetermined position on the alignment element. The storage unit is configured to receive coupling elements that have been coupled with an adhesive element.

According to a further non-limiting embodiment, a method is provided for dispensing adhesive elements, using a device comprising a first holder, a second holder and an alignment element. The method includes, but is not limited to, rotatably holding a film having adhesive elements and a protective layer attached on adhesive areas of the adhesive elements, using the first holder. The method further includes, but is not limited to, moving the adhesive elements towards the alignment elements. The method further includes, but is not limited to, receiving and peeling off the protective layer from the adhesive areas of the adhesive elements as the adhesive elements move towards the set of alignment elements, using the second holder. The method further includes, but is not limited to, providing the adhesive elements at a predetermined position on the alignment element.

DESCRIPTION OF THE DRAWINGS

Embodiments of the present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

It is desirable to provide a device for dispensing adhesive elements, such as tabs for inserts for aircraft furniture, that is precise and ergonomic.

The disclosed embodiments relate to devices and systems for dispensing adhesive elements that are placed on film and protected by a protective layer.

In accordance with the disclosed embodiments, aligning a coupling element means to guide a coupling element relative to a structure, such as an adhesive area of an adhesive element, for example.

According to an example, the device is configured to unroll a film with adhesive elements by using a plurality of holders and to move the adhesive elements to a predetermined position on an alignment element.

According to an embodiment, the adhesive elements may be aligned with the alignment element using a guide. The guide may be a pin or a needle. Thus, the guide may force an adhesive element to move to a predetermined position on the alignment element.

In an example, the guide may be made from a metal such as steel, aluminum or stainless steel, for example.

As soon as an adhesive element is positioned in its predetermined position on the alignment element, the adhesive element may be connected to a coupling element, such as a tab for an insert for aircraft furniture, for example.

According to a further embodiment, the coupling element may be guided to a position relative to the adhesive element by a guide. The guide may be the same guide used to force the adhesive element to its predetermined position. Alternatively, an additional guide may be used to move the coupling element to a predetermined position relative to the adhesive element. This means that the guide enables a precise alignment of the coupling element with respect to the adhesive element. Since the guide is used to force the adhesive element and/or coupling element to a predetermined position, the adhesive element and the coupling can be aligned with each other while reducing or avoiding eye and finger strain.

The guide may comprise a number of guiding elements. A guiding element may be a pin or a needle made from a metal such as steel, aluminum or stainless steel, for example.

In an example, the guide may be arranged in a shape that is based on a shape of an adhesive element. This means, the guide or a number of guides may be arranged in a negative shape of an adhesive element, such as a circle for example. Thus, the guide may be configured to extend through an adhesive element. According to an embodiment, the guide may comprise a lower part that is configured to guide the adhesive element to a predetermined position relative to the guide and the guide may comprise an upper part that extends above the adhesive element and that is configured to guide the coupling element to the predetermined position relative to the adhesive element.

The elements of the guide may be arranged in any other shape, such as in a rectangle or in a number of lines. This means that the guide may be configured to receive an adhesive element and to force the adhesive element in a predetermined position relative to an alignment element. This predetermined position may be surrounded by the guide, such that the guide places the adhesive element in a predetermined position on the alignment element.

Additionally, or alternatively, the guide may be arranged in a shape that is based on a shape of a coupling element. This means that the guide may be configured to receive a coupling element and to force the coupling element to move in a predetermined position defined by the guide. For this purpose, the predetermined position may be surrounded by the guide, such that the guide places the coupling element on the alignment element in a predetermined position relative to an adhesive element, for example. Thus, the guide may have the shape or may comprise guiding elements that are arranged in the shape of the adhesive element or the coupling element. For example, the guide may surround an area that has the same diameter or a diameter that is slightly larger than a diameter of the adhesive element or the coupling element.

According to another embodiment, the guide may be configured to extend through an adhesive element to place a coupling element on a predetermined position on the adhesive element. This, means that the guide or at least guiding elements of the guide may extend through recesses in the adhesive element, so that the adhesive element is placed in a predetermined position relative to the guide. The guide may protrude from the adhesive element, so that a lower portion of the guide may be used to place the adhesive element in the predetermined position with respect to the guide and an upper portion of the guide may be used to place a coupling element in a predetermined position with respect to the adhesive element and the guide, for example.

According to an embodiment, the device may comprise a third holder. The third holder may be configured to apply tension to the film and guide the film towards the second holder.

According to another embodiment, the holders may comprise rolls. Rolls may be used to wrap the film on them and/or to move the film in a predetermined trajectory.

According to another embodiment, the rolls may have a rubberized surface. A rubberized surface may help to attach the film to a holder and to move the film along a predetermined trajectory.

According to an example, the second holder may comprise one or more rods that act as a reverse puller and tensioner.

According to a further example, the film comprising the substrate layer carrying the adhesive elements and the protective layer may enter the second holder under a lower rod of the second holder. In this example, the protective layer is peeled off the adhesive elements at a point where the film enters the second holder under the lower rod and then directed back and up to an upper rod and onto a roll of the second holder.

A greater understanding of the systems, devices, and methods described above may be obtained through a review of the illustrations accompanying this application together with a review of the detailed description that follows.

Figure 1:
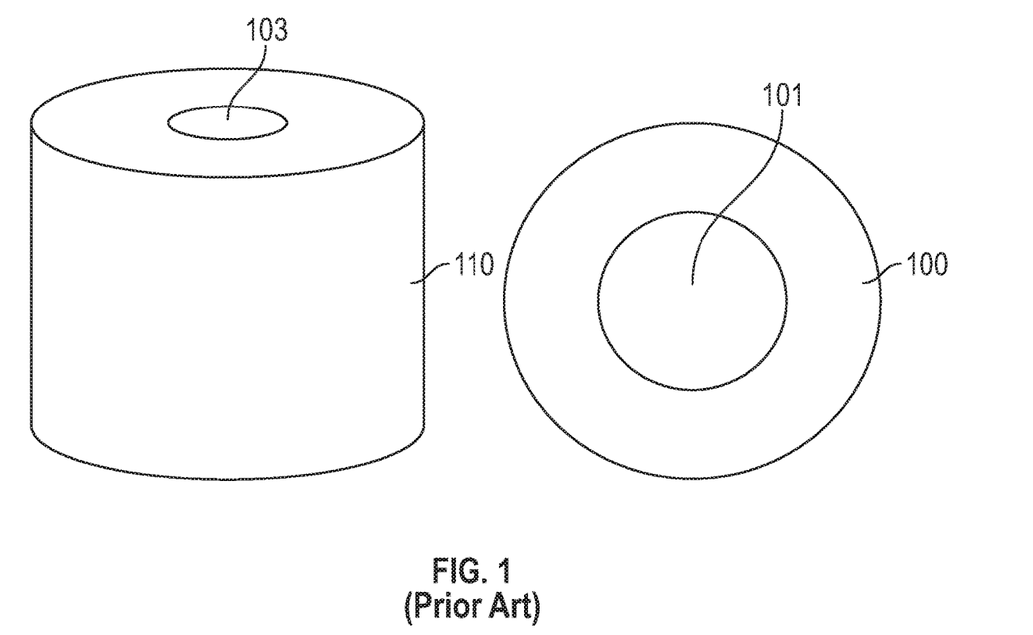
FIG. 1 is a schematic view illustrating a film of adhesive elements and a coupling element suitable for use with the device, system and method of the disclosed embodiments.

FIG. 1 shows an adhesive element 100 and a coupling element 110. The adhesive element 100 has an aperture 101. The adhesive element 100 is configured to be attached to the coupling element 110. The coupling element 110 also has an aperture 103. Thus, the adhesive element 100 is configured to be attached to the coupling element 110 in a way that aperture 101 and aperture 103 overlap each other and the coupling element may be filled through the aperture 101 of the adhesive element 100 with an epoxy, for example.

In order to guarantee an overlap of aperture 101 and aperture 103, a precise alignment of the adhesive element 100 and the coupling element 110 is necessary. Such a precise alignment is very hard to achieve in a manual approach. Thus, the device as shown with respect to FIG. 2 is provided, which provides for a semi-automatic alignment of the adhesive element 100 with the coupling element 110.

Figure 2:
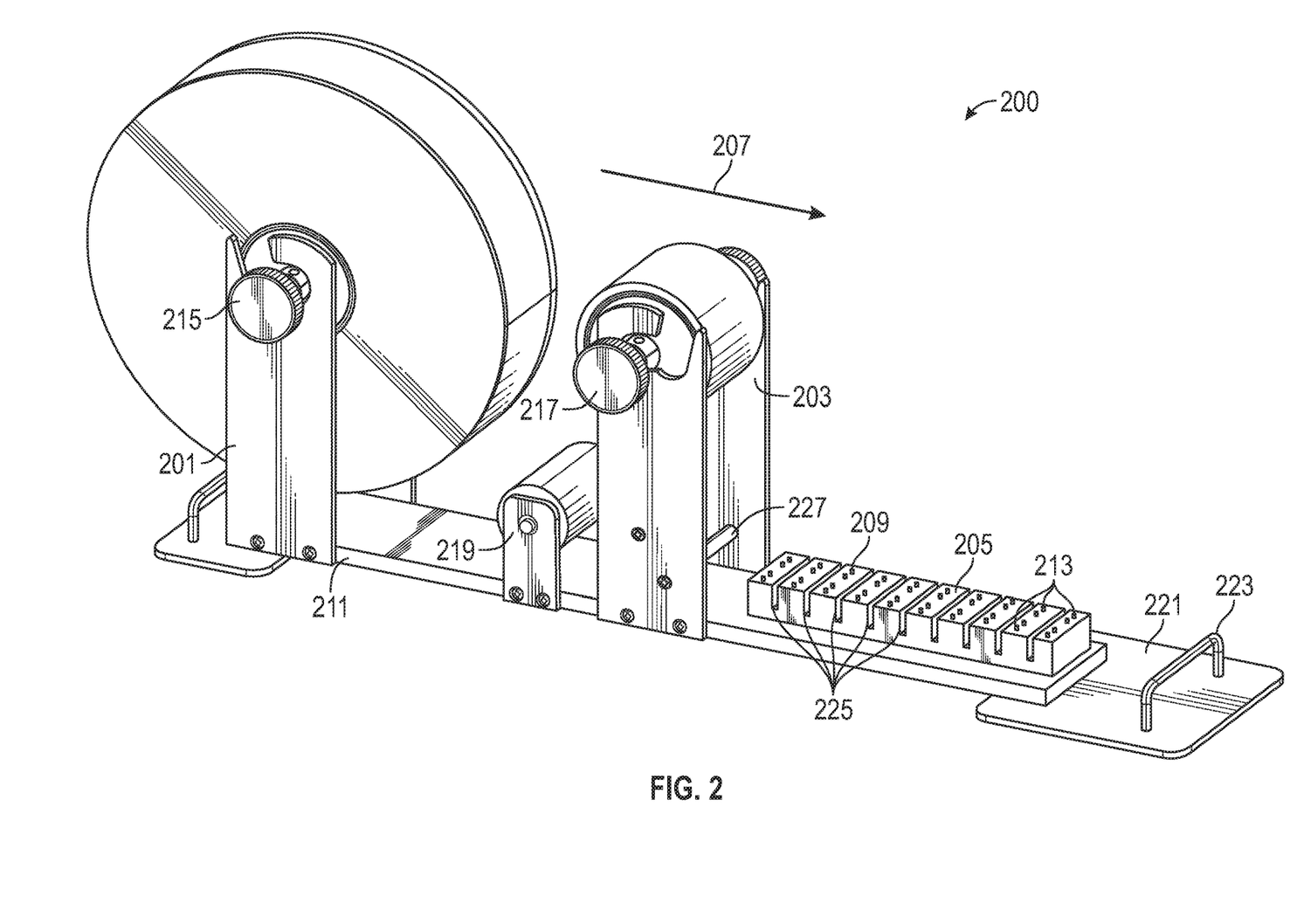
FIG. 2 is a schematic view illustrating a device for dispensing adhesive elements in accordance with one non-limiting implementation of the disclosed embodiments.

FIG. 2 shows a device 200. The device 200 comprises a first holder 201, a second holder 203 and an alignment element 205.

First holder 201 is configured to rotatably hold a film with adhesive elements and a protective layer attached on adhesive areas of the adhesive elements.

First holder 201, second holder 203 and alignment element 205 are arranged in a row in the direction of the movement of the adhesive elements, as indicated by arrow 207.

Second holder 203 is configured to receive the protective layer, so that the protective layer is peeled off the adhesive areas of the adhesive elements as the adhesive elements, together with a substrate layer of the film, are moved towards the set of alignment elements.

Alignment element 205 is configured to provide the adhesive elements at a predetermined position on the alignment element. Thus, the alignment 205 presents the adhesive elements in a way that enables a user to access the adhesive elements with a coupling element and to couple an adhesive element with a coupling element.

Alignment element 205 may comprise guides 209 that are configured to force the adhesive element and/or the coupling element to move to a predetermined position relative to the alignment element 205. The guides 209 may be used to align the coupling element with respect to the adhesive element, such that a precise overlap of the adhesive element and the coupling element is achieved.

Since the guides 209 force the adhesive elements and/or the coupling elements to the predetermined position, a manual alignment of the adhesive elements and the coupling elements, which causes finger fatigue and eye strain, can be avoided.

Guides 209 may be pins or needles and may be made from metal.

In an example, guides 209 may extend through recesses in the adhesive element.

Alignment element 205 may be a block made from metal or plastic, such as vinyl or phenol, for example. Thus, the alignment element 205 may be a phenolic block.

Alignment element 205 may comprise guides 209 as an integral component of the alignment element. Additionally, or alternatively, guides 209 may be replaceable, such that other configurations, i.e., other shapes or distances may be realized in order to force other adhesive elements and/or coupling elements to move to a predetermined position.

Alignment element 205 may be rotatably attached to a ground body 211 of device 200. By rotating alignment element 205, a second set of guides 213 attached to the alignment element 205 may be used instead of guides 209. The second set of guides 213 may replace guides 209 when they are worn-out or when another configuration of guides is needed.

First holder 201 and second holder 203 may comprise rolls, such as plastic rolls 215 and 217, for example, which roll within first holder 201 and second holder 203, respectively. According to a non-limiting embodiment, roll 215 of the first holder 201 is holding a standard three inch core (not numbered) of the film having adhesive elements. Rolls 215 and 217 are used to move the film comprising the adhesive elements through the device 200.

Figure 3:
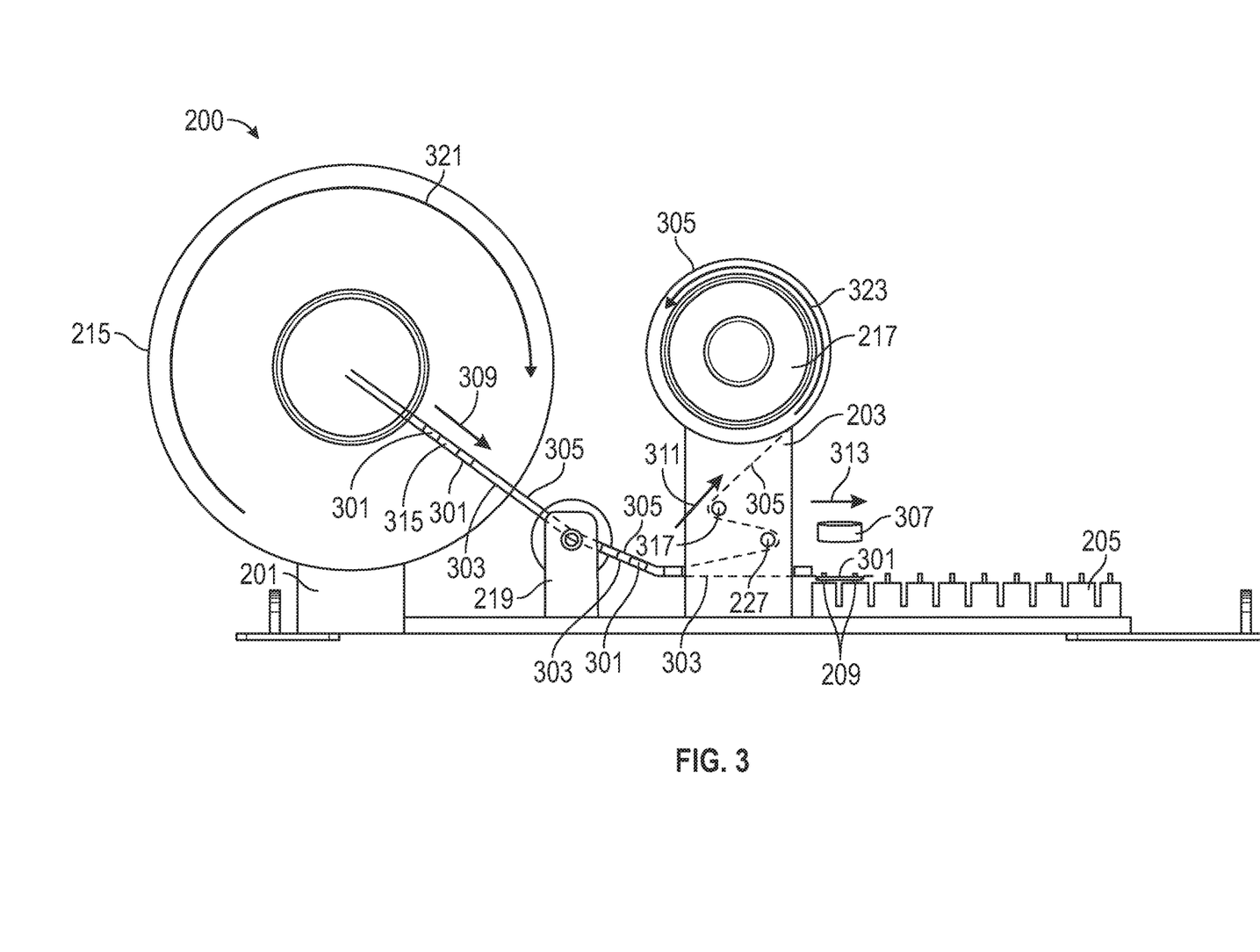
FIG. 3 is a side view illustrating the device shown in FIG. 2 in operation.

A third holder 219 may be positioned between first holder 201 and second holder 203. In an example, the third holder 219 may be configured to guide the film on its way towards the second holder 203 and to tension the film, as shown in FIG. 3.

The tension may be applied by a friction element included in the third holder 219. The third holder 219 may be adjustable vertically and/or horizontally.

According to a non-limiting embodiment, the second holder 203 comprises a lower rod 227 that may be used to peel off the protective layer from the adhesive elements. The lower rod 227 may be used to guide the protective layer back and up to an upper rod (not shown) and then onto the roll 217.

Device 200 may comprise a magnet 221. Magnet 221 may be used to hold a pair of scissors or any other metallic tool.

Device 200 may comprise a handle 223. Handle 223 may be used to carry the device 200.

FIG. 3 shows a side view of device 200 with a film 315 comprising a substrate layer 303 with adhesive elements 301 and a protective layer 305 on adhesive areas of the adhesive elements 301 according to an embodiment.

In FIG. 3, the film 315 is moved from the first roll 215 of the first holder 201 towards the third holder 219. Since the third holder 219 is arranged in a lower position than the first holder 201 and the second holder 203, the third holder 219 applies tension to the film that moves from the first holder 201 to the second holder 203.

In the second holder 203, the film 315 enters under the lower rod 227, where the protective layer 305 is peeled off from the adhesive elements 301 and directed back and up an upper rod 319 to a second roll 217 of the second holder 203.

According to an embodiment, the upper rod 319 and the lower rod 227 are placed in the same level.

In an example, the first roll 215 moves clockwise, as indicated by arrow 321 and the second roll 217 moves counterclockwise, as indicated by arrow 323. Thus, the first roll 215 and the second roll 217 may move in opposite directions with respect to each other.

As the protective layer 305 is peeled off from the adhesive elements 301, the substrate layer 303 with the adhesive elements 303 moves towards the alignment element 205.

Preferably, the protective layer 305 and the substrate layer 303 are moved relative to each other, i.e., with the same speed.

Guides 209 are used to align the adhesive elements 301 with respect to the alignment element. For example, the guides 209 may extend through recesses in the adhesive element 301.

As soon as the adhesive element 209 is placed in a position relative to the guides 209, the adhesive element 301 may be coupled to a coupling element 307 that is placed relative to the alignment element 205 by an upper portion of guides 209 extending through the adhesive element 209, so that the adhesive element 301 connects to the coupling element 307 at a certain point on the coupling element 307.

In an example, the movement of the coupling element 307 towards the adhesive element 301 placed relative to the guides 209 may be performed in a manual operation guided by an upper portion of guides 209.

Preferably, roll 217 of the second holder 203 may be turned to peel off the protective layer 305 from the adhesive elements 301 as indicated by arrows 309 and 311. Additionally, the substrate layer 303 is moved towards the alignment element 205.

In an example, movement of substrate layer 303 towards the alignment element 205 may be performed by pulling substrate layer 303 on the alignment element 205 in a manual operation, as indicated by arrow 313.

Additionally, or alternatively, the first holder 201 and the second holder 203 may comprise static elements, such as cylinders or other elements to provide for a predetermined trajectory for the film 315.

In an example, the guides 209 may pass thru substrate layer 303.

In another example, the guides 209 may pass thru substrate layer 303 and an adhesive element 301.

As soon as the adhesive elements 301 are placed in a predetermined position on the alignment element 205, the substrate layer 303 may be cut by using a pair of scissors, for example. By cutting the substrate layer 303, the adhesive elements 301 can be moved independent from the remaining film 315.

According to an example, the alignment element 205 may have a number of recesses 225, in which a pair of scissors may be moved to cut the substrate layer of the film 315.

First holder 201 may be used to rotatably hold the film 315 comprising the adhesive elements. Thus, the film 315 may be attached to first holder 201 in the beginning. The film 315 may be unrolled from first holder 201 as the roll 217 of second holder 203 is moved to wrap up protective layer 305 of the film. This means that the film 315 transfers a movement of roll 217 of the second holder 203, to first holder 201, i.e., to the roll 215 moved in first holder 201.

Roll 215 and/or roll 217 may be rubberized, so that movement of roll 217 and/or 215 is directly transferred to the film 315.

Rolls 217 and 215 each may have a diameter of 3 inch at their edges and a diameter of 2.75 inches in an area between the edges. Thus, the edges of the rolls 217 and 215 may be used to hold the film 315 or the protective layer 305 on the rolls 217, 215 as the rolls 217 and 215 move.

Figure 4:
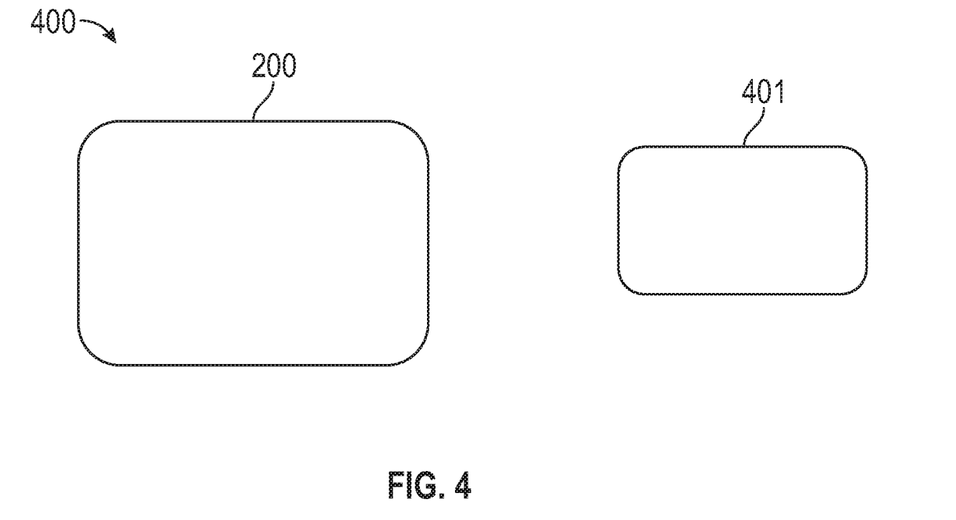
FIG. 4 is a schematic view illustrating a system for dispensing adhesive elements in accordance with one non-limiting implementation of the disclosed embodiments.

FIG. 4 shows a system 400 according to an embodiment. System 400 comprises device 200 as described with respect to FIGS. 2 and 3 and a storage unit 401.

Storage unit 401 is configured to receive coupling elements that have already been coupled with an adhesive element. This means, that storage unit 401 may be equipped with a number of coupling elements that have been coupled with adhesive elements. Thus, a plurality of coupling elements may be coupled with adhesive elements and stored for later use using the storage unit 401.

Preferably, storage unit 401 is a portable storage unit. Thus, storage unit 401 may be used to carry a plurality of coupling elements that have been coupled with adhesive elements using the device 200. Respectively, device 200 may be used by a plurality of users with a plurality of storage units 401 working on different locations without moving the device 200.

Storage unit 401 may be shaped to receive the coupling elements directly from the alignment element 205. Thus, storage unit 401 may be put over coupling elements provided by the alignment element 205 in order to place all coupling elements provided by the alignment element 205 in the storage unit 401.

Figure 5:
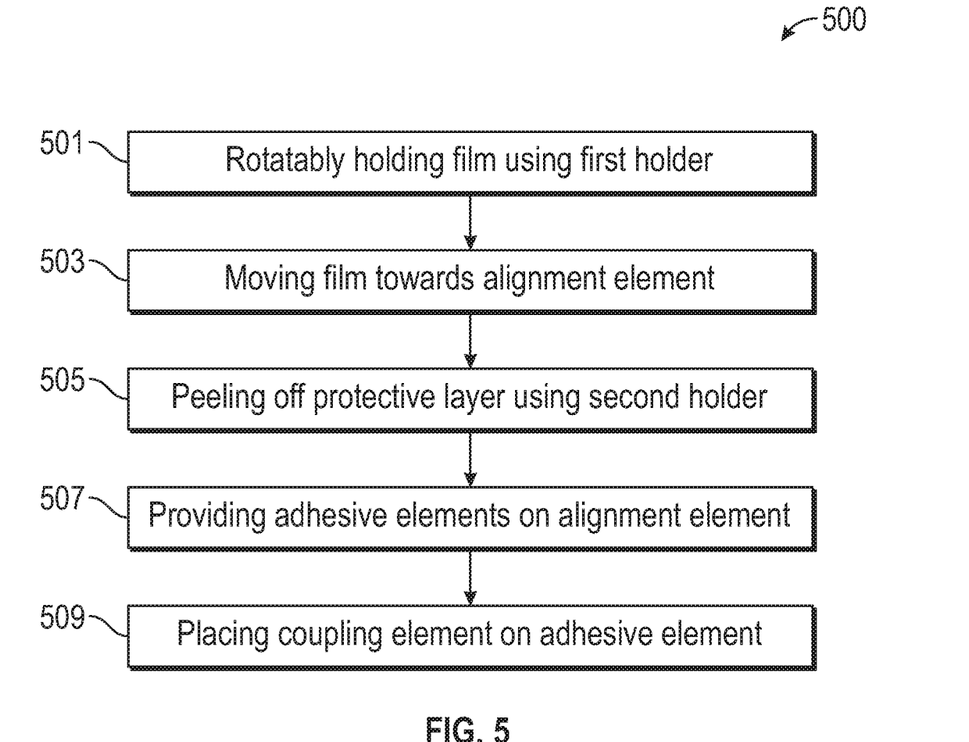
FIG. 5 is a flow chart illustrating an exemplary method for dispensing adhesive elements in accordance with a further non-limiting implementation of the disclosed embodiments; and, FIG. 6 is a schematic view illustrating a guide for moving a coupling element towards a predetermined position relative to an adhesive element in accordance with one non-limiting implementation of the disclosed embodiments.

FIG. 5 is a diagram that illustrates different aspects of a method 500 for dispensing adhesive elements 100 as described with respect to FIG. 1 using a device 200 as described with respect to FIGS. 2 and 3, according to an embodiment.

Method 500 starts with rotatably holding a film with adhesive elements and a protective layer attached on adhesive areas of the adhesive elements using a first holder of device 200 in a first step 501. This means, a film, such as a roll of adhesive elements, is rotatably attached to the first holder. The film may be attached to a roll 215 of the first holder 201, for example.

In a second step 503, the adhesive elements are moved with the film towards the alignment element.

In a third step 505, the protective layer is received and peeled off from the adhesive areas of the adhesive elements as the adhesive elements move towards the alignment element, by using the second holder of device 200. The film may be moved by moving a roll of the second holder, which is used to wrap up a protective layer peeled off from the film. The protective layer may be attached to the roll of the second holder. For this purpose, the roll of the second holder may have a rubberized surface.

In a fourth step 507, the adhesive elements are provided at a predetermined position on the alignment element of device 200. The adhesive elements may be forced to move in the predetermined position with their adhesive side up, by using one or more guides attached to the alignment element, for example. The guides may be pins or needles, for example.

Figure 6:
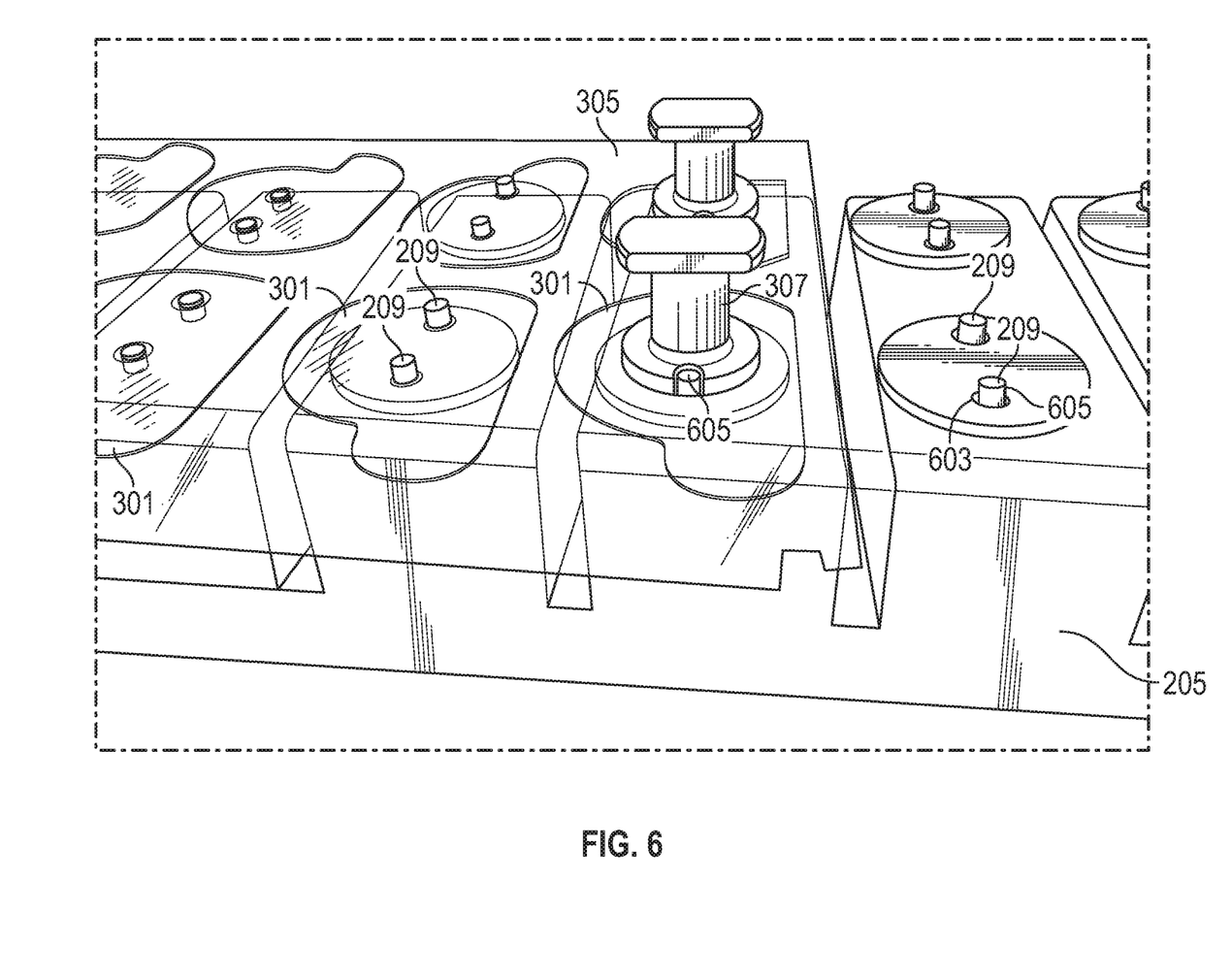

According to an embodiment, method 500 further comprises a fifth step 509, for placing a coupling element on an adhesive site of an adhesive element provided by the alignment element as shown in FIG. 6, for example.

FIG. 6 shows a detailed view of an alignment element 205 as described with respect with FIG. 2, for example. Alignment element 205 comprises guides 209 used to force a coupling element 307 and an adhesive element 301 to a predetermined position relative to each other and relative to the guides 209, as shown in FIG. 2. For this purpose, guides 209 have a lower portion 603 that force the adhesive element 301 to move to a predetermined position relative to the guides 209. In other words, the guides 209 extend through the adhesive element 301 thereby placing the adhesive element 301 in a predetermined position relative to the guides 209.

Further, the guides 209 have an upper portion 605 that extends above the adhesive element 301. Thus, the upper portion 605 can be used to place the coupling element 307 in a predetermined position relative to the guides 209 and the adhesive element 301 when the coupling element 307 is moved towards the adhesive element 301.

The upper portion 605 of guides 209 may extend through at least a portion of the coupling element 307. Thus, the coupling element 307 may have recesses for receiving the upper portion 605 of a guide 209.

The upper portion 605 of guide 209 may have the same shape or may have a different shape compared to the lower portion 603.

The first set of guides 603 may be attachable to the second set of guides 601.

According to an embodiment, the method further comprises guiding the film on its way towards the second holder by a third holder, and tensioning the film on its way towards the second holder by the third holder.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. For example, although the disclosed embodiments are described with reference to a flight control computer of an aircraft, those skilled in the art will appreciate that the disclosed embodiments could be implemented in other types of computers that are used in other types of vehicles including, but not limited to, spacecraft, submarines, surface ships, automobiles, trains, motorcycles, etc. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A device for dispensing adhesive elements, the device comprising:
a first holder configured to rotatably hold a film having adhesive elements and a protective layer attached on adhesive areas of the adhesive elements;
a second holder configured to receive the protective layer as the protective layer is peeled off the adhesive areas of the adhesive elements while the adhesive elements move towards an alignment element; and
the alignment element arranged in a direction of movement of the adhesive elements at a predetermined position on the alignment element and configured to receive and align the adhesive elements.

2. The device according to claim 1, further comprising a third holder configured to apply tension to the film and guide the film towards the second holder.

3. The device according to claim 1, wherein the first and second holders comprise first and second rolls, respectively.

4. The device according to claim 1, wherein the alignment element comprises a guide that is configured to guide a coupling element towards a predetermined position relative to an adhesive element on the alignment element.

5. The device according to claim 4, wherein the guide is configured to extend through an adhesive element, wherein the guide comprises a lower part that is configured to guide the adhesive element to a predetermined position relative to the guide, and wherein the guide comprises an upper part that extends above the adhesive element and that is configured to guide the coupling element to the predetermined position relative to the adhesive element.

6. The device according to claim 4, wherein the guide is configured to place the adhesive element at a predetermined position on the alignment element.

7. The device according to claim 6, wherein the guide is a pin or a needle.

8. The device according to claim 1, wherein the device comprises a magnet, wherein the magnet is configured to hold a pair of scissors.

9. The device according to claim 1, wherein the device comprises a handle for carrying the device.

10. The device according to claim 1, wherein the first holder, the second holder, and the alignment element are arranged in a row in the direction of the movement of the adhesive elements.

11. The device according to claim 1, wherein the alignment element is a phenolic block.

12. The device according to claim 1, wherein the adhesive elements are tabs for furniture inserts.

13. The device according to claim 1. wherein at least one part of the second holder has a rubberized surface.

14. The device according to claim 1, wherein the alignment element is rotatably attached to a ground body of the device.

15. A system for dispensing adhesive elements, the system comprising:
a first holder;
a second holder;
an alignment element; and
a storage unit;
the first holder configured to rotatably hold a film having adhesive elements and a protective layer attached on adhesive areas of the adhesive elements;
the second holder configured to receive the protective layer as the protective layer is peeled off the adhesive areas of the adhesive elements while the adhesive elements move towards the alignment element; and
the alignment element arranged in a direction of movement of the adhesive elements at a predetermined position on the alignment element and configured to receive and align the adhesive elements, and
wherein the storage unit is configured to receive coupling elements that have been coupled with an adhesive element.

16. The system according to claim 15, wherein the storage unit is a portable storage unit.

17. A method for dispensing adhesive elements using a device comprising a first holder, a second holder and an alignment element, the method comprising the following steps:
rotatably holding a film with adhesive elements and a protective layer attached on adhesive areas of the adhesive elements, using the first holder;
moving the adhesive elements towards the alignment element;
receiving and peeling off the protective layer from the adhesive areas of the adhesive elements as the adhesive elements move towards the alignment element, using the second holder; and
providing the adhesive elements at a predetermined position on the alignment element.

18. The method according to claim 17, wherein the method further comprises:
guiding the film on its way towards the second holder by a third holder, and
tensioning the film on its way towards the second holder by the third holder.

19. The method according to claim 17, wherein the method further comprises:
placing a coupling element on an adhesive site of an adhesive element provided by the alignment element.

20. The method according to claim 17, wherein the method further comprises:
guiding the coupling element at a predetermined position relative to the adhesive areas of an adhesive element, by a guide.

* * * * *